US008201254B1

(12) United States Patent
Wilhelm et al.

(10) Patent No.: US 8,201,254 B1
(45) Date of Patent: Jun. 12, 2012

(54) DETECTION OF E-MAIL THREAT ACCELERATION

(75) Inventors: Jeffrey Wilhelm, Los Angeles, CA (US); Carey Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 2042 days.

(21) Appl. No.: 11/214,631

(22) Filed: Aug. 30, 2005

(51) Int. Cl.
*G06F 11/00* (2006.01)

(52) U.S. Cl. ............ 726/24; 726/25; 713/188; 709/224; 709/225

(58) Field of Classification Search ............ 713/1, 2, 713/188, 194; 380/200, 201, 255, 277; 726/2, 726/23–25; 709/224, 225
See application file for complete search history.

(56) References Cited

U.S. PATENT DOCUMENTS

| | | | |
|---|---|---|---|
| 5,805,810 A * | 9/1998 | Maxwell | 709/206 |
| 6,167,434 A | 12/2000 | Pang | |
| 6,249,807 B1 | 6/2001 | Shaw et al. | |
| 6,282,565 B1 | 8/2001 | Shaw et al. | |
| 6,289,416 B1 | 9/2001 | Fukushima et al. | |
| 6,324,569 B1 | 11/2001 | Ogilvie et al. | |
| 6,487,586 B2 | 11/2002 | Ogilvie et al. | |
| 6,493,007 B1 | 12/2002 | Pang | |
| 6,546,416 B1 | 4/2003 | Kirsch | |
| 6,640,301 B1 | 10/2003 | Ng | |
| 6,643,685 B1 | 11/2003 | Millard | |
| 6,650,890 B1 | 11/2003 | Irlam et al. | |
| 6,654,787 B1 | 11/2003 | Aronson et al. | |
| 6,687,740 B1 | 2/2004 | Gough | |
| 6,691,156 B1 | 2/2004 | Drummond et al. | |
| 6,697,942 B1 | 2/2004 | L'Heureux | |
| 6,701,347 B1 | 3/2004 | Ogilvie | |
| 6,711,608 B1 | 3/2004 | Ogilvie | |
| 6,732,157 B1 | 5/2004 | Gordon et al. | |
| 6,745,192 B1 * | 6/2004 | Libenzi | 707/100 |
| 6,757,713 B1 | 6/2004 | Ogilvie et al. | |
| 6,757,830 B1 | 6/2004 | Tarbotton et al. | |
| 6,941,304 B2 * | 9/2005 | Gainey et al. | 707/10 |
| 6,993,660 B1 * | 1/2006 | Libenzi et al. | 713/188 |

(Continued)

OTHER PUBLICATIONS

CAUCE.org web pages [online] Coalition Against Unsolicited Commercial Email [retrieved Mar. 17, 2003] Retrieved from the Internet: <URL: http://www.cauce.org/about/problem.shtml> U.S.A.
Outlook.spambully.com web pages [online] Spam Bully [retrieved Jan. 16, 2003] Copyright 2002, Retrieved from the Internet <URL: http://outlook.spambully.com/about.php>.

(Continued)

*Primary Examiner* — Zachary A Davis
*Assistant Examiner* — Joseph Pan
(74) *Attorney, Agent, or Firm* — Fenwick & West LLP

(57) ABSTRACT

A plurality of queuing components each monitor an incoming email stream, and identify incoming email messages with suspicious attachments. Each queuing component generates signatures of the suspicious attachments, and submits periodic reports to a correlation component. The reports list signatures and receipt times for suspicious attachments received since a last submitted report. The queuing component queues the suspicious attachments for a specified hold time, and further processes queued attachments based upon information concerning attachment acceleration rates received from the correlation component. The correlation component receives reports from the plurality of queuing components, and uses information in the submitted reports to maintain a system wide receipt history for each suspicious attachment. The correlation component uses the receipt histories to calculate receipt acceleration rates for suspicious attachments, which it provides to the queuing components, to be used to manage the queued attachments.

16 Claims, 2 Drawing Sheets

U.S. PATENT DOCUMENTS

| | | | | |
|---|---|---|---|---|
| 7,089,241 | B1* | 8/2006 | Alspector et al. | 1/1 |
| 7,162,513 | B1* | 1/2007 | Kister et al. | 709/206 |
| 7,177,958 | B1* | 2/2007 | La Blanc et al. | 710/16 |
| 7,571,478 | B2* | 8/2009 | Munson et al. | 726/23 |
| 7,676,546 | B2* | 3/2010 | Hallam-Baker | 709/206 |
| 2002/0007453 | A1* | 1/2002 | Nemovicher | 713/155 |
| 2002/0075857 | A1* | 6/2002 | LeBlanc | 370/352 |
| 2002/0087641 | A1 | 7/2002 | Levosky | |
| 2002/0138581 | A1 | 9/2002 | MacIntosh et al. | |
| 2003/0149726 | A1 | 8/2003 | Spear | |
| 2003/0167311 | A1 | 9/2003 | Kirsch | |
| 2003/0191969 | A1 | 10/2003 | Katsikas | |
| 2003/0200334 | A1 | 10/2003 | Grynberg | |
| 2003/0220978 | A1 | 11/2003 | Rhodes | |
| 2003/0229672 | A1 | 12/2003 | Kohn | |
| 2003/0233415 | A1 | 12/2003 | Beyda | |
| 2004/0003283 | A1 | 1/2004 | Goodman et al. | |
| 2004/0024823 | A1 | 2/2004 | Del Monte | |
| 2004/0054887 | A1 | 3/2004 | Paulsen et al. | |
| 2004/0064734 | A1 | 4/2004 | Ehrlich | |
| 2004/0068534 | A1 | 4/2004 | Angermayr et al. | |
| 2004/0073617 | A1 | 4/2004 | Milliken et al. | |
| 2004/0093383 | A1 | 5/2004 | Huang et al. | |
| 2004/0093384 | A1 | 5/2004 | Shipp | |
| 2004/0111480 | A1 | 6/2004 | Yue | |
| 2004/0111531 | A1* | 6/2004 | Staniford et al. | 709/246 |
| 2004/0128355 | A1* | 7/2004 | Chao et al. | 709/206 |
| 2004/0148358 | A1 | 7/2004 | Singh et al. | |
| 2004/0199592 | A1* | 10/2004 | Gould et al. | 709/206 |
| 2004/0205173 | A1 | 10/2004 | Hall | |
| 2004/0218615 | A1* | 11/2004 | Griffin et al. | 370/401 |
| 2004/0230834 | A1* | 11/2004 | McCallam | 713/201 |
| 2005/0102499 | A1* | 5/2005 | Kosuga et al. | 713/152 |
| 2006/0047769 | A1* | 3/2006 | Davis et al. | 709/207 |
| 2006/0075048 | A1* | 4/2006 | Gruper et al. | 709/206 |
| 2008/0021969 | A1* | 1/2008 | Oliver et al. | 709/206 |
| 2009/0031136 | A1* | 1/2009 | Milliken et al. | 713/176 |

OTHER PUBLICATIONS

NBEC/NWOCA Anti-Spam Tools, [online] [retrieved Jul. 7, 2004] retrieved from http://home.nwoca.org, Ohio, U.S.A., Jul. 7, 2004.

Kularski, C. "Compound Procedures for Spam Control," Highland School of Technology, Gastonia, NC, U.S.A., Jan. 2004.

"Technical Responses to Spam," Nov. 2003, Taughannock Networks, Trumansburg, New York, U.S.A.

Cranor, Faith, L., LaMacchia, Brian A., "Spam!" Communications of the ACM, vol. 41, No. 8, pp. 74-83, Aug. 1998. U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

* cited by examiner

DETECTION OF E-MAIL THREAT ACCELERATION

TECHNICAL FIELD

This invention pertains generally to computer security, and more specifically to detecting accelerating email threats.

BACKGROUND

Mass-mailing worms are some of the most prevalent and troublesome threats to Internet users today. Worms like Netsky, Beagle, MyDoom, and most recently, Sober, have caused millions of dollars in damage and cleanup costs. Despite the use of computer security software, thousands of users are typically infected in the first few hours of a new worm's outbreak, before security analysts have an opportunity to capture and analyze a sample, and subsequently to create and deploy a signature. To make matters worse, the increasing availability and quality of runtime packers and other obfuscation tools are making it easier for worm writers to automate the creation of new variants of a worm, making analysis more complicated and time consuming.

In order to effectively protect users and reduce the cleanup burden of these major threats, it would be highly desirable to be able to stop any type of mass-mailing worm during the first few hours of its outbreak. What is needed are methods, systems and computer readable media for effectively detecting fast spreading worms, including metamorphic worms, in real time during their initial spread.

SUMMARY OF INVENTION

Computer-implemented methods, computer systems and computer-readable media detect accelerating distribution of malicious email attachments, thereby identifying early stage malicious code outbreaks. A plurality of queuing components are deployed at email gateways across the Internet. Each queuing component monitors an incoming email stream, and identifies incoming email messages with suspicious attachments. The queuing component generates signatures of the suspicious attachments, and submits periodic reports to a correlation component. The reports list signatures and receipt times for suspicious attachments received since a last submitted report. The queuing component queues the suspicious attachments for a specified hold time, and further processes queued attachments based upon information concerning attachment acceleration rates received from the correlation component.

The correlation component receives reports from a plurality of queuing components. The correlation component uses information in the submitted reports to maintain a system wide receipt history for each suspicious attachment. These receipt histories are used to calculate receipt acceleration rates for suspicious attachments, and thereby detect anomalous spikes in the rate of distribution of suspicious attachments. The correlation component provides this receipt acceleration rate information to queuing components, to be used to manage the queued attachments.

More specifically, when the specified hold time for a queued attachment has transpired, the queuing component queries the correlation component for corresponding acceleration information. The correlation component returns this information, which it has calculated as described above. Responsive to an indication from the correlation component that the attachment is exhibiting anomalous acceleration, the queuing component can increase the corresponding queuing time, or permanently quarantine the attachment. Otherwise, the queuing component can release the attachment into the email stream for delivery.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
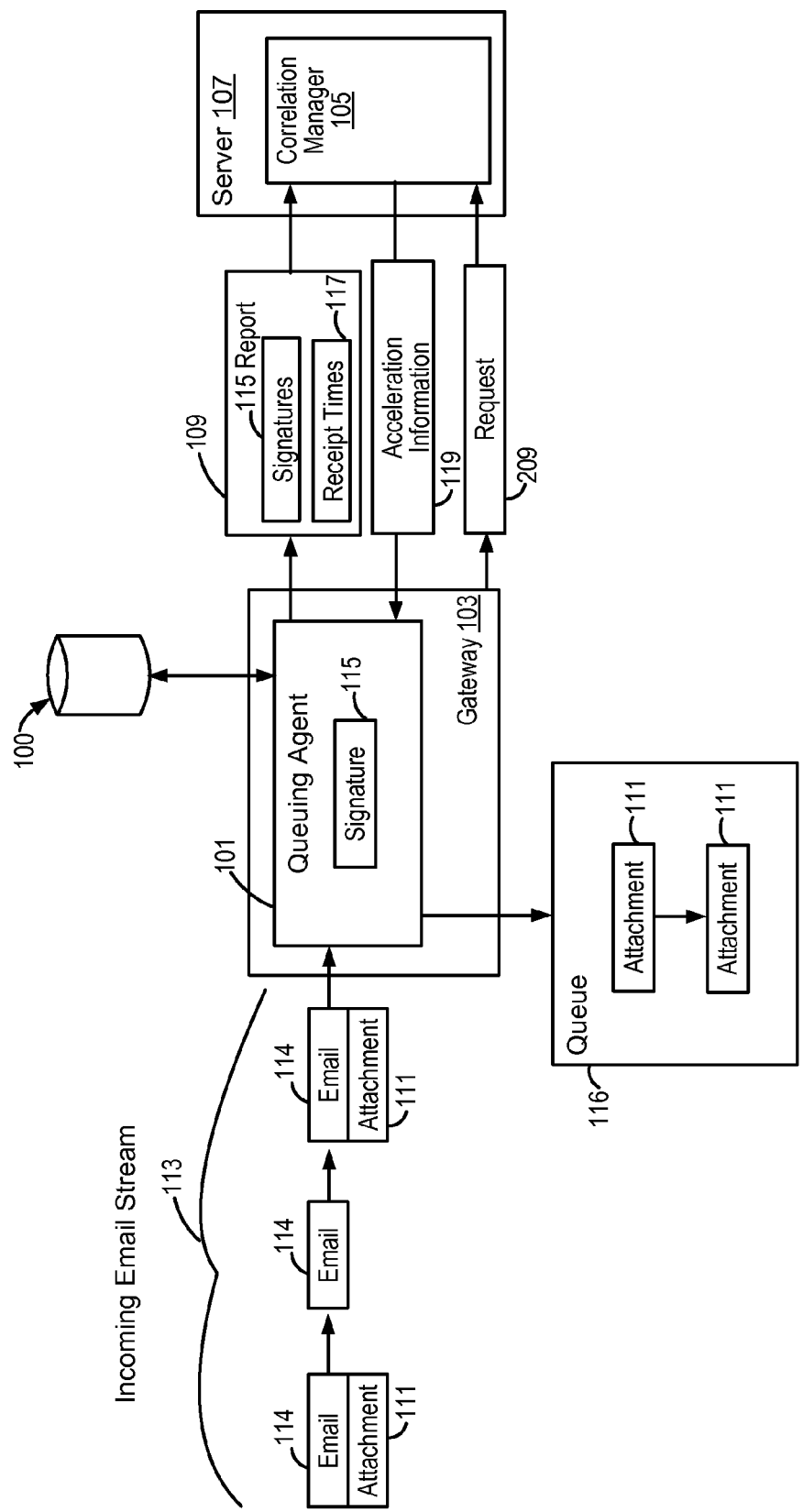
FIG. 1 is a block diagram illustrating a high level overview of a system for detecting and managing accelerating email threats, according to some embodiments of the present invention.

FIG. 1 illustrates a high level overview of a system 100 for practicing some embodiments of the present invention. A queuing agent 101 is deployed at an organization's email gateway 103, and works in conjunction with a centralized correlation manager 105 which typically executes on a server 107. In practice, typically a plurality of queuing agents 101 are deployed at email gateways 103 of various organizations across the Internet. These queuing agents 101 report data 109 concerning the receipt of suspicious attachments 111 to the correlation manager 105, which manages and correlates reported data 109 from the various queuing agents 101 in order to identify potential threats based on the acceleration of their distribution across the Internet by email. The correlation manager 105 communicates this information 119 back to the queuing agents 101, which can take action to either delay or quarantine suspicious attachments 111 where appropriate.

It is to be understood that although the queuing agent 101 and correlation manager 105 are each illustrated as single entities, as the terms are used herein "queuing agent" 101 and "correlation manager" 105 refer to functionalities which can be implemented as software, hardware, firmware or any combination of these. Where either a queuing agent 101 or a correlation manager is implemented as software, it can be implemented as a standalone program, but can also be implemented in other ways, for example as part of a larger program, as a plurality of separate programs, as one or more device drivers or as one or more statically or dynamically linked libraries.

In FIG. 1, a queuing agent 101 is illustrated as being deployed at an email gateway 103. It is to be understood that in other embodiments a queuing agent 101 can be instantiated on and/or as part of a server, client, firewall, intrusion detection system, proxy, switch and/or any combination of these and/or other computing devices and/or platforms. Furthermore, a queuing agent 101 can be implemented as or as a component of a software security suite, plug-in and/or any application that monitors email streams. Although only a single queuing agent 101 is illustrated for visual clarity, as noted above typically a plurality of a queuing agents 101 will be deployed at various locations across the Internet.

Likewise, FIG. 1 illustrates the correlation manager 105 residing on a server 107. It is to be understood that in other embodiments the correlation manager 105 can be instantiated on and/or as part of a client, firewall, intrusion detection system, proxy, switch, gateway and/or any combination of these and/or other computing devices and/or platforms. Although only a single correlation manager 105 is illustrated for visual clarity, of course the described functionality can be shared and/or load balanced between multiple correlation managers 105 executing on one or multiple computing devices.

As illustrated in FIG. 1, a queuing agent 101 monitors an incoming email stream 113, and identifies suspicious attachments 111 to incoming email messages 114. Typically, a suspicious attachment 111 is any attachment that is of a format that could potentially contain malicious code (e.g., an .exe file, a script, a .jpg file, a zip file containing any of the above, etc.). If the attachment is not potentially malicious (i.e., could not possibly contain an infection), the queuing agent 101 releases the email message 114 with its attachment into the email stream 113 for delivery. Otherwise, additional analysis on the suspicious attachment 111 is performed as discussed below. Those of ordinary skill in the relevant art know which file format types are potentially malicious, and which specific formats to consider suspicious (i.e. potentially malicious) can be determined as desired. It is to be understood that as used herein, the term "suspicious attachment" 111 can refer not only to a file transmitted with an email message, but also to executable content within the body of the email 114 itself.

The queuing agent 101 generates one or more signatures 115 of each suspicious attachments 111. The methodology to use to generate a signature 115 can be as simple as hashing the contents of the file (e.g., by using CRC, MD5, SHA-1, etc.) or can be in the form of a more complex technique that analyzes the structure of the file to generate polymorphism-resistant signatures 115. Which manner of signature 115 to generate is a variable design choice. Generating hashes and other simple signatures 115 is known to those of ordinary skill in the relevant art, and the implementation mechanics thereof within the context of the present invention will readily apparent to those so skilled in light of this specification. Methodology for generation of signatures 115 resistant to metamorphic threats is described in co-pending U.S. patent application Ser. No. 11/233,195 titled "Metamorphic Threat Signature Generation," filed on Sep. 22, 2005, having the same inventors and assignee, the entirety of which is herein incorporated by reference.

The queuing agent 101 places each email 114 with an as-yet-unknown suspicious attachment 111 into a queue 116 for a hold time (e.g., six minutes) which is long enough to ensure that its receipt will be reported to the correlation manager 105. The specific length of the hold time to use is a variable design parameter, based upon how often the queuing agent 101 sends reports 109 to the correlation manager 105, as discussed below. In some embodiments, the queuing agent 101 queues only the suspicious attachments 111, and releases email messages 114 stripped of their suspicious attachments 111 into the email stream 113 for delivery. In other embodiments, the queuing agent 101 holds both the body of an email 114 as well as its suspicious attachment(s) 111.

Typically, where a signature 115 of an attachment 111 matches that of an item already in the agent's 101 queue 116, that queue entry is incremented to indicate that multiple attachments 111 within this time interval have the same signature 115. Otherwise, a new queue entry is created for the attachment 111.

At desired reporting intervals (e.g., every five minutes), the queuing agent 101 contacts the correlation manager 105 and submits a report 109 comprising signatures 111 and receipt times 117 for all suspicious attachments 111 that the agent 101 has received over the past reporting interval (i.e., since the last report 109 was sent). If any given suspicious signature 111 has been received multiple times within the reporting period, this information can be included in the report 109 as well. It is to be understood that the specific length of time to use as the reporting interval to use is a variable design parameter.

As discussed in greater detail below, the queuing agent 101 further processes queued emails 114 based on information 119 concerning system wide acceleration rates of suspicious attachments 111 received from the correlation manager 105 in response to the submitted reports 109.

Figure 2:
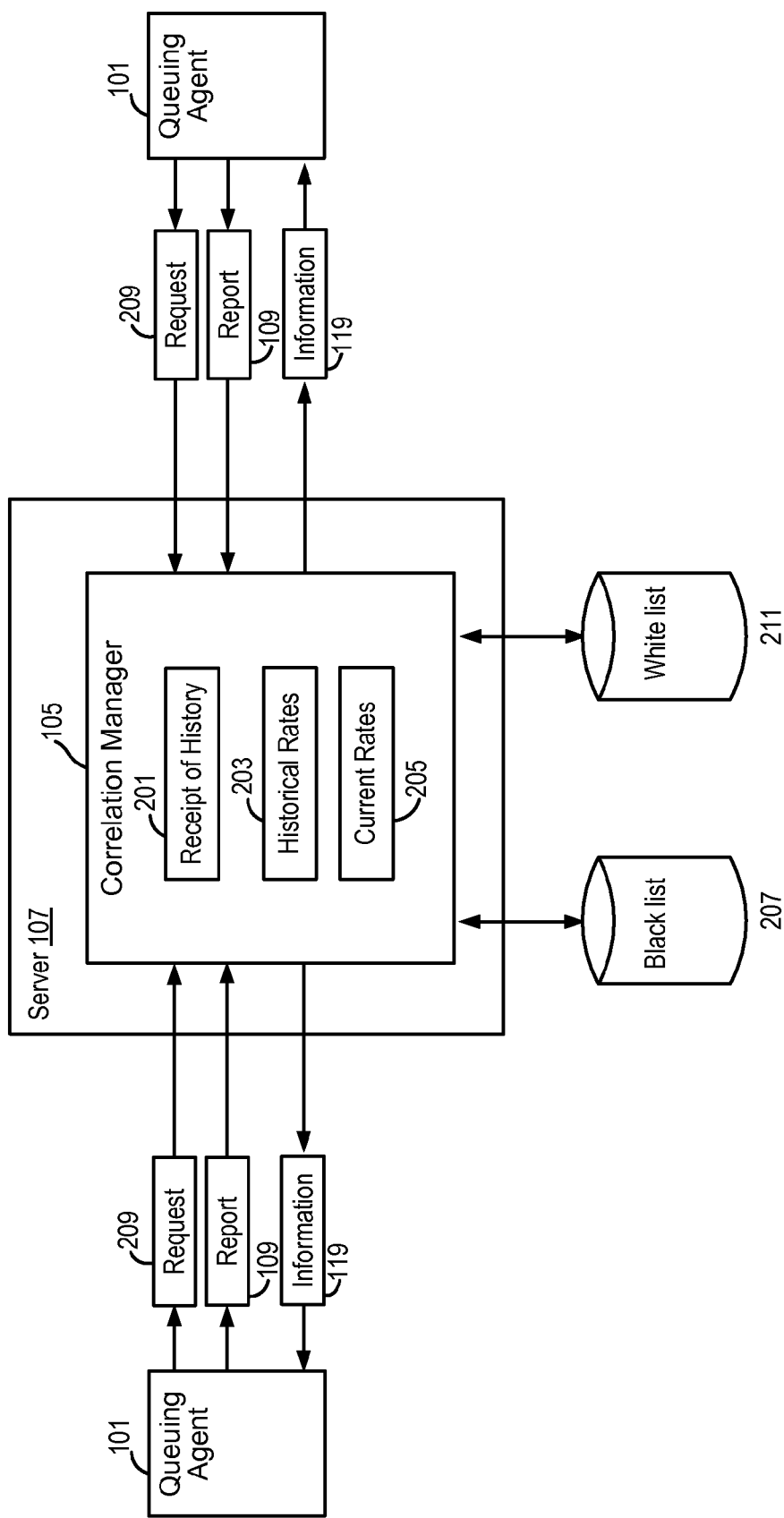
FIG. 2 is a block diagram illustrating the operations of a correlation manager, according to some embodiments of the present invention.

Turning now to FIG. 2, the operation of the correlation manager 105 is discussed. The correlation manager 105 receives reports 109 from each operating queuing agent 101, and thus receives information 109 concerning the receipt of suspicious attachments 111 by various organizations deployed throughout the Internet. The correlation manager 105 correlates this reported data 109 to maintain a receipt history 201 of all traffic attributed to each particular attachment 111 from all of the reporting agents 101. This history 201 is used to calculate an historical acceleration rate 203 and a current acceleration rate 205 (e.g., over the last or the last few reporting periods) for the attachments 111. An acceleration rate 203, 205 can be trivially computed by comparing several differences of the number of attachments 111 with a given signature 115 over the last n reporting periods, where n is an integer the specific value of which is a variable design parameter. It is to be understood that the historical acceleration rate 203 for an attachment 111 is to be used as a control, so as to detect spikes in the current acceleration rate 205. An anomalous increase in the acceleration rate 205 of an attachment 111 is a sign that the attachment 111 is malicious. The history 201 can also be used to calculate a historical variance, or standard deviation, in the historical acceleration rate. This measurement can then be used in setting the threshold for detecting an anomalous spike.

If the current acceleration rate 203 (e.g., number of instances or velocity currently as compared to historically) of an attachment 111 exceeds a threshold, the correlation manager 105 can add the corresponding signature 115 to a blacklist 207 of attachments 111 that are exhibiting anomalous acceleration. It is to be understood that what attachment 111 receipt frequency and/or number of receipts of an attachment 111 over what period of time is needed for the acceleration of a specific attachment to be considered anomalous is a variable design parameter, which can but need not be tied to specific queuing agents 101 (i.e., some or all queuing agents 101 can have unique acceleration tolerance thresholds). Defaults thresholds can also be used as desired. In one embodiment, the anomaly threshold may be based on the historical standard deviation of the attachment, such that the observed acceleration of the attachment must exceed the historical average acceleration by a configurable number of standard deviations to be considered anomalous.

In some embodiments, the correlation manager 105 distributes the blacklist 207 to the queuing agents 101. Additionally, if a signature 115 included in a received report 109 is present on the correlation manager's 101 blacklist 207, the correlation manager 105 can so inform the queuing agent 101 immediately.

In addition to the reports 109, the correlation manager 105 receives requests 209 from queuing agents 101 to identify whether particular attachments 111 are exhibiting anomalous acceleration. Based on a specific agent's 101 threshold (or a default threshold), the correlation manager 105 compares the current 205 acceleration rate to the historical acceleration rate 203 of the attachment 111 to determine if anomalous acceleration is occurring. The correlation manger 101 then returns the results 119 to the requesting agent 101. In other embodiments, the correlation manager simply transmits the raw acceleration rate data 119, and the agent 101 itself uses this data 119 to determine whether anomalous acceleration is occurring.

In some embodiments, the correlation manager 105 component is distributed across multiple load-balanced applications and/or computing devices (not illustrated) in order to process the volume of traffic received from agents 101. These computing devices can be arranged hierarchically or peer-to-peer to process incoming data. Distributed hashing techniques can be used to load-balance signature hashes across multiple correlation managers 105 instances (e.g., hash values of 000000-100000 go to server 0, hash values of 100001-200000 go to server 2, etc.).

In some embodiments, the correlation manager 105 provides additional capabilities to allow an analyst (not illustrated) to manage executable signaturing. For example, in one embodiment a whitelist 211 is maintained which is available to the correlation manager 105 in order to mitigate false positives. Human analysts or software add signatures 115 of known benevolent attachments 111 to the whitelist 211. Certain attachments 111 might accelerate at a rate so as to appear malicious, and yet be known to the analysts not to be so (e.g., a joke program that tends to spread exponentially through users manually emailing it to their friends and co-workers). In such embodiments, responsive to receiving a report 109 from a queuing agent 101 indicating receipt of an attachment 111 the signature 115 of which is on the whitelist 211, the correlation manager 105 returns an indication 119 that the attachment 111 is known to be legitimate Returning now to FIG. 1, as discussed above, the queuing agent 101 further processes queued emails 114 based on information 119 concerning system wide acceleration rates of suspicious attachments 111 received from the correlation manager 105 in response to submitted reports 109. Where the correlation manager 105 returns an indication 119 that a specific attachment 111 is known to be malicious, the queuing agent 101 examines its queue 116 and quarantines any queued emails 114 having that attachment 111. Based upon the acceleration rate 205 of the attachment 111 and/or the toleration level of the specific queuing agent 101, the queuing agent 101 can significantly increase the hold time (e.g., by 45 minutes, several hours, or more) for such an attachment 111 rather than quarantine it outright.

In some embodiments, the queuing agent 101 maintains a local blacklist 207 (e.g., initially received from the correlation manager 105 or self generated). In such embodiments, responsive to the correlation manager 105 sending an indication that a specific signature 115 is known to be that of a malicious attachment 111, the queuing agent adds the signature 115 to a locally maintained blacklist 207. In embodiments in which a queuing agent 101 maintains a blacklist 207 locally, the queuing agent 101 quarantines incoming emails 114 in the stream 113 with attachments 111 on the blacklist 207, and can remove old signatures 115 from the blacklist 207 that have aged out as desired.

The queuing agent 101 examines the queue 116 and determines which emails 114 have reached their hold time. When a queued email 114 has reached its hold time, the agent 101 contacts the correlation manager 105 for acceleration information concerning the attachment 111. If the attachment 111 is not exhibiting abnormal acceleration, the email message and its attachment 111 are released into the email stream 113 for delivery. On the other hand, if the attachment 111 is exhibiting anomalous acceleration, the hold time for the email is increased by a configurable amount (for example, 45 minutes). For a continuously accelerating attachment (e.g., a worm with exponential growth), the attachment will be held each time the delivery check is performed. If the exhibited acceleration becomes sufficiently anomalous (e.g., the acceleration rate 205 exceeds a threshold) the email 114 and attachment 111 can be quarantined (i.e., held indefinitely) or held until an administrator deletes or releases them.

One of the chief characteristics of mass-mailing worms that distinguish them from legitimate attachments is the rate at which they spread. Like a biological infection, mass-mailing worms will typically exhibit exponential growth in the first few hours before anti-virus signatures can be distributed. Measuring and observing a consistent growth in the acceleration of an attachment is a strong indicator of ongoing exponential growth. Thus, fast spreading worms can be effectively combated by measuring the acceleration of attachments across the Internet, and taking action to block malicious attachments based on the tell-tale behavior of their acceleration characteristics. Because the present invention can utilize polymorphic-proof signatures 115 as well as hashes, it can detect polymorphic worms as well as more traditional malicious code.

As will be understood by those familiar with the art, the invention may be embodied in other specific forms without departing from the spirit or essential characteristics thereof. Likewise, the particular naming and division of the modules, agents, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for detecting accelerating distribution of malicious email attachments, the method comprising:

using a computer to perform steps comprising:

monitoring an incoming email stream;

identifying incoming email messages with suspicious attachments;
generating signatures of the suspicious attachments;
queuing the suspicious attachments for a hold time;
submitting a report to a correlation component, the report listing signatures identifying suspicious attachments and containing information indicating a number of instances of each identified suspicious email attachment received in a current reporting period;
receiving, from the correlation component, an indication of whether a current acceleration rate for an identified suspicious attachment is anomalous, the current acceleration rate for the identified suspicious attachment determined responsive to a comparison of a number of instances of the identified suspicious attachment received by a plurality of queuing components in the current reporting period to a number of instances of the identified suspicious attachment received by the queuing components in one or more prior reporting periods, the indication of whether the current acceleration rate for the identified suspicious attachment is anomalous determined responsive to the current acceleration rate exceeding a historical variance threshold, the historical variance threshold determined by calculating a historical variance of the number of instances of the identified suspicious email attachment received by the queuing components in the prior reporting periods; and
responsive to receiving an indication that the current acceleration rate for the identified suspicious attachment is anomalous:
determining whether the current acceleration rate for the identified suspicious attachment exceeds an acceleration tolerance threshold;
responsive to the current acceleration rate for the identified suspicious attachment exceeding the acceleration tolerance threshold, queuing instances of the suspicious attachment until the suspicious attachment instances are deleted or released by an administrator; and
responsive to the current acceleration rate for the identified suspicious attachment not exceeding the acceleration tolerance threshold:
increasing the hold time associated with the suspicious attachment; and
queuing instances of the suspicious attachment for the increased hold time associated with the suspicious attachment.

2. The method of claim 1, further comprising:
releasing an email message stripped of the attachment into the email stream.

3. The method of claim 1 wherein receiving the indication further comprises:
receiving, from the correlation component, a blacklist of signatures of attachments having anomalous current acceleration rates; and
responsive to receiving an email with an attachment a signature of which is on the blacklist, quarantining that attachment.

4. The method of claim 1 further comprising:
responsive to receiving an indication from the correlation component that the current acceleration rate for the identified suspicious email attachment is not anomalous, releasing the attachment into the email stream.

5. The method of claim 1, wherein queuing instances of the suspicious attachment for an indefinite hold time comprises quarantining the instances of the suspicious attachment.

6. A computer implemented method for detecting accelerating distribution of malicious email attachments, the method comprising:
using a computer to perform steps comprising:
receiving reports from a plurality of queuing components, each report listing signatures identifying suspicious email attachments and containing information indicating a number of instances of each identified suspicious email attachment received by that queuing component in a current reporting period;
calculating a current acceleration rate for a suspicious email attachment based on the reports from the plurality of queuing components, the current acceleration rate comparing a number of instances of an identified suspicious email attachment received by the queuing components in the current reporting period to a number of instances of the identified suspicious email attachment received by the queuing components in one or more prior reporting periods;
determining whether the current acceleration rate for the suspicious email attachment is anomalous responsive to the current acceleration rate exceeding a historical variance threshold, the historical variance threshold determined by calculating a historical variance of the number of instances of the identified suspicious email attachment received by the queuing components in the prior reporting periods; and
reporting the determination of whether the current acceleration rate for the suspicious email attachment is anomalous to queuing components;
wherein, responsive to a determination that the current acceleration rate for the identified suspicious attachment is anomalous, the queuing components are adapted to:
determine whether the current acceleration rate for the identified suspicious attachment exceeds an acceleration tolerance threshold;
responsive to the current acceleration rate for the identified suspicious attachment exceeding the acceleration tolerance threshold, queue instances of the suspicious attachment until the suspicious attachment instances are deleted or released by an administrator;
responsive to the current acceleration rate for the identified suspicious attachment not exceeding the acceleration tolerance threshold:
increase the hold time associated with the suspicious attachment; and
queue instances of the suspicious attachment for the increased hold time associated with the suspicious attachment.

7. The method of claim 6, wherein the reporting comprises:
responsive to receiving a query from a queuing component concerning an email attachment, returning a current acceleration rate concerning that attachment to the queuing component.

8. The method of claim 6, wherein the reporting comprises:
adding a signature identifying the suspicious email attachment to a blacklist responsive to a determination that the current acceleration rate for the suspicious email attachment is anomalous; and
distributing the blacklist to queuing components.

9. The method of claim 6, wherein determining whether the current acceleration rate for the suspicious email attachment is anomalous further comprises:

comparing the current acceleration rate for the suspicious email attachment to a threshold based on a historical average acceleration for the suspicious email attachment; and evaluating whether the current acceleration rate is anomalous responsive to the comparison with the threshold.

10. A non-transitory computer readable medium, containing an executable computer program product for detecting accelerating distribution of malicious email attachments, the computer program product comprising:

program code for monitoring an incoming email stream;

program code for identifying incoming email messages with suspicious attachments;

program code for generating signatures of the suspicious attachments;

program code for queuing the suspicious attachments for a hold time;

program code for submitting a report to a correlation component, the report listing signatures identifying suspicious attachments and containing information indicating a number of instances of each identified suspicious email attachment received in a current reporting period;

program code for receiving, from the correlation component, an indication of whether a current acceleration rate for an identified suspicious attachment is anomalous, the current acceleration rate for the identified suspicious attachment determined responsive to a comparison of a number of instances of the identified suspicious attachment received by a plurality of queuing components in the current reporting period to a number of instances of the identified suspicious attachment received by the queuing components in one or more prior reporting periods, the indication of whether the current acceleration rate for the identified suspicious attachment is anomalous determined responsive to the current acceleration rate exceeding a historical variance threshold, the historical variance threshold determined by calculating a historical variance of the number of instances of the identified suspicious email attachment received by the queuing components in the prior reporting periods; and program code for, responsive to receiving an indication that the current acceleration rate for the identified suspicious attachment is anomalous:

determining whether the current acceleration rate for the identified suspicious attachment exceeds an acceleration tolerance threshold;

responsive to the current acceleration rate for the identified suspicious attachment exceeding the acceleration tolerance threshold, queuing instances of the suspicious attachment until the suspicious attachment instances are deleted or released by an administrator; and responsive to the current acceleration rate for the identified suspicious attachment not exceeding the acceleration tolerance threshold:

increasing the hold time associated with the suspicious attachment; and queuing instances of the suspicious attachment for the increased hold time associated with the suspicious attachment.

11. The computer readable medium containing the computer program product of claim 10 wherein receiving the indication further comprises:

receiving, from the correlation component, a blacklist of signatures of attachments having anomalous current acceleration rates; and responsive to receiving an email with an attachment a signature of which is on the blacklist, quarantining that attachment.

12. The computer readable medium containing the computer program product of claim 10 further comprising:

program code for, responsive to receiving an indication from the correlation component that the current acceleration rate for the identified suspicious email attachment is not anomalous, releasing the attachment into the email stream.

13. A non-transitory computer readable medium containing an executable computer program product for detecting accelerating distribution of malicious email attachments, the computer program product comprising:

program code for receiving reports from a plurality of queuing components, each report listing signatures identifying suspicious email attachments and containing information indicating a number of instances of each identified suspicious email attachment received by that queuing component in a current reporting period;

program code for calculating a current acceleration rate for a suspicious email attachment based on the reports from the plurality of queuing components, the current acceleration rate comparing a number of instances of an identified suspicious email attachment received by the queuing components in the current reporting period to a number of instances of the identified suspicious email attachment received by the queuing components in one or more prior reporting periods;

program code for determining whether the current acceleration rate for the suspicious email attachment is anomalous responsive to the current acceleration rate exceeding a historical variance threshold, the historical variance threshold determined by calculating a historical variance of the number of instances of the identified suspicious email attachment received by the queuing components in the prior reporting periods;

program code for reporting the determination of whether the current acceleration rate for the suspicious email attachment is anomalous to queuing components; and wherein, responsive to receiving an indication that the current acceleration rate for the identified suspicious attachment is anomalous, the queuing components are adapted to:

determine whether the current acceleration rate for the identified suspicious attachment exceeds an acceleration tolerance threshold;

responsive to the current acceleration rate for the identified suspicious attachment exceeding the acceleration tolerance threshold, queue instances of the suspicious attachment until the suspicious attachment instances are deleted or released by an administrator; and responsive to the current acceleration rate for the identified suspicious attachment not exceeding the acceleration tolerance threshold:

increase the hold time associated with the suspicious attachment; and queue instances of the suspicious attachment for the increased hold time associated with the suspicious attachment.

14. The computer readable medium containing the computer program product of claim 13, wherein the program code for reporting comprises:

program code for, responsive to receiving a query from a queuing component concerning an email attachment, returning a current acceleration rate concerning that attachment to the queuing component.

15. The computer readable medium containing the computer program product of claim 13, wherein the reporting comprises:

adding a signature identifying the suspicious email attachment to a blacklist responsive to a determination that the current acceleration rate for the suspicious email attachment is anomalous; and distributing the blacklist to queuing components.

16. The computer readable medium containing the computer program product of claim 13, wherein determining whether the current acceleration rate for the suspicious email attachment is anomalous further comprises:

comparing the current acceleration rate for the suspicious email attachment to a threshold based on a historical average acceleration for the suspicious email attachment; and evaluating whether the current acceleration rate is anomalous responsive to the comparison with the threshold.

* * * * *